United States Patent
Hagnauer

(10) Patent No.: US 9,863,540 B2
(45) Date of Patent: Jan. 9, 2018

(54) ASEPTIC VALVE ASSEMBLY, SYSTEM FOR CONDUCTING A PRODUCT, AND METHOD FOR OPERATING A SYSTEM

(71) Applicant: GEA Tuchenhagen GmbH, Büchen (DE)

(72) Inventor: Thomas Christian Hagnauer, Thun (CH)

(73) Assignee: GEA Tuchenhagen GmbH, Büchen (DE)

( * ) Notice: Subject to any disclaimer, the term of this patent is extended or adjusted under 35 U.S.C. 154(b) by 56 days.

(21) Appl. No.: 14/901,113

(22) PCT Filed: May 28, 2014

(86) PCT No.: PCT/EP2014/001428
§ 371 (c)(1),
(2) Date: Dec. 28, 2015

(87) PCT Pub. No.: WO2014/206520
PCT Pub. Date: Dec. 31, 2014

(65) Prior Publication Data
US 2016/0138720 A1 May 19, 2016

(30) Foreign Application Priority Data
Jun. 24, 2013 (DE) .................. 10 2013 010 429

(51) Int. Cl.
*F16K 3/36* (2006.01)
*F16K 1/44* (2006.01)

(52) U.S. Cl.
CPC ......... *F16K 1/446* (2013.01); *Y10T 137/4259* (2015.04); *Y10T 137/87121* (2015.04)

(58) Field of Classification Search
CPC ......... Y10T 137/4245; Y10T 137/4259; Y10T 137/4266; Y10T 137/87153; Y10T 137/87249
See application file for complete search history.

(56) References Cited

U.S. PATENT DOCUMENTS

| | | |
|---|---|---|
| 2,755,130 A | 7/1956 | Arant |
| 3,260,504 A | 7/1966 | Mojonnier et al. |
| (Continued) | | |

FOREIGN PATENT DOCUMENTS

| | | |
|---|---|---|
| DE | 203 17 882 U1 | 2/2004 |
| DE | 10 2007 011 094 A1 | 9/2008 |
| EP | 0 332 806 A2 | 1/1989 |

*Primary Examiner* — R. K. Arundale
(74) *Attorney, Agent, or Firm* — Young Basile Hanlon & MacFarlane, P.C.

(57) ABSTRACT

A valve assembly comprises a housing, a chamber having a first product opening, a second product opening, a first closable secondary opening that can be connected to a steam line, and a second closable secondary opening. The assembly also includes a first closing element by which the first product opening can be closed, a second closing element by which the second product opening can be closed, and an outlet associated with the second secondary opening. A switching valve is arranged between the second secondary opening and the outlet such that a fluid connection between the outlet and the second secondary opening can be switched to a fluid connection between the outlet and an inlet provided on the switching valve. The inlet can be connected to a steam line, while simultaneously closing the second secondary opening. A system comprising the valve assembly and a method for operating the system are described.

16 Claims, 6 Drawing Sheets

(56) References Cited

U.S. PATENT DOCUMENTS

| | | | |
|---|---|---|---|
| 3,563,268 A | | 2/1971 | Williams |
| 5,232,023 A | * | 8/1993 | Zimmerly ................. B67C 3/28 137/240 |
| 5,390,694 A | | 2/1995 | Zimmerly et al. |
| 5,469,880 A | * | 11/1995 | Zimmerly ................. B67C 3/28 137/240 |
| 6,293,300 B1 | * | 9/2001 | Dumke ................... F16K 1/446 137/312 |
| 9,121,516 B2 | * | 9/2015 | Sauer ...................... F16K 1/446 |
| 2010/0108146 A1 | * | 5/2010 | Ferreira .................... A61L 2/07 137/1 |
| 2011/0017313 A1 | * | 1/2011 | Grossman ................. B08B 9/00 137/14 |
| 2013/0056091 A1 | | 3/2013 | Sauer |

\* cited by examiner

ASEPTIC VALVE ASSEMBLY, SYSTEM FOR CONDUCTING A PRODUCT, AND METHOD FOR OPERATING A SYSTEM

TECHNICAL FIELD

The invention relates to an aseptic valve assembly, a system for conducting a product including the aseptic valve assembly, and a method for operating a system including the aseptic valve assembly.

BACKGROUND

Aseptic valve assemblies are used in sterile process technology, for example in food technology, in order to be able to guide a product from a first product line into a second product line.

A generic valve assembly, installed in a system, is shown in FIG. 1. The valve assembly 1s is arranged between a first product line 2 and a second product line 3 and has a product valve 4. In the open state of the product valve, a fluid connection between the first product line 2 and the second product line 3 is connected through chamber 5 and inlet chamber 6 so that a product flow is possible between the product lines. Due to the two chambers 5 and 6, the product valve is also called a double chamber valve.

The system has a steam line 7, from which a first branch line 8 and a second branch line 9 branch off and lead to the valve assembly 1s. The first branch line 8 is connected with a steam valve 10, which is connected to the chamber 5. With the help of this steam valve 10, the chamber 5 is pressurizable intermittently with steam. The second branch line 9 is connected to a sequence valve 12, which is itself connected with the leak valve 11 and a disposal line 13.

In the case of finicky products, it is common, for additional security, to supply the leak valve 11, also called a side valve, on the product valve 4 with steam in order to eliminate the contamination risk from the atmosphere. Up until now, this has been realized via the additional sequence valve 12 designed as a shutoff valve at the leak outlet.

The disposal line 13 guides the fluid flow to a branch valve 14. The fluid flow can be switched to a condensate drain 15 by means of this branch valve 14, through which condensed steam can be supplied to a disposal device 16. Alternatively, the branch valve 14 can direct the fluid flow to a disposal valve 17 instead of the condensate drain 15. If the disposal valve 17 is opened in this circuit, the fluid flow is directed to the disposal device 16 by circumvention of the condensate drain 15.

A similar valve assembly is known from DE 203 17 882 U1. Steam valve 10 and leak valve 11 are shown in it. In order to simplify the representation, the sequence valve 12 and the details of the disposal branch are omitted.

A slightly different type of steam barrier is shown in EP 0 332 806 A2. Steam valve 10 and leak valve 11 are present, but the sequence valve 12 is replaced by a shutoff valve in the branch line 9, which is labeled with the reference number 15 in EP 0332 806 A2.

SUMMARY

These valve assemblies known in the state of the art are complex from a construction point of view. The technical control implementation of the method for operating the valve assembly is also complex.

In contrast, embodiments of the invention include a simplified valve assembly, which leads to a simplification of the system for conducting a product as well as a simplified system and a simple method for operating said system.

According to the teachings herein, the leak valve of the valve assembly is replaced with a switching valve. This is then arranged such that with it, on one hand, a fluid connection can be switched between a chamber and an outlet of the valve assembly and, on the other hand, between an inlet, which can be connected to a steam line, and the outlet. In addition to two product openings, which are closable by means of closing elements, the chamber has a first secondary opening and a second secondary opening, wherein the switching valve is connected with the second secondary opening, which is closed when the fluid connection between the inlet and outlet is established. The switching valve has the function of a leak valve and a steam valve, wherein the functions are coupled, that is as soon as the switching valve closes in its function as a leak valve, it opens in its function as a steam valve and vice versa. A considerable economic and technical advantage thereby occurs. The economic advantage results from less installation effort, among others for valve, activation and feedback signal. A technical advantage exists because the functions of the leak valve and of the steam valve are mechanically locked. When the supply of steam is opened, the leak valve closes and vice versa. There is thus no risk of a faulty switching. The valve assembly is hereby simplified overall. The sequence valve is superfluous in the system and is thus economized. The technical control effort is also reduced.

A very good cleanability of the valve assembly is achieved when the closing members for closing product openings are separately actuatable.

A first bellows can be arranged between the first and second closing element. A second bellows can be arranged between the second closing element and a housing passage. The bellows improve the properties of the valve assembly for use in applications with high sterility requirements.

A simple structure of the switching valve is achieved in a further development in that the switching valve comprises a closer with two sealing assemblies.

The valve assembly can be designed in a more compact and cost-effective manner in that one of the sealing assemblies of the closer works together with a valve seat provided in the housing of the valve assembly.

It is advantageous with respect to fluid dynamics and force effects on the valve assembly to design closer, sealing assemblies and valve seats of the switching valve such that the respective closed position is effectuated by a force directed opposite a flow directed respectively at the outlet.

Pressurizing agent supplies are cost-effective, testing and widespread in systems so that at least the first closing element, second closing element and sequence valve are advantageously designed adjustably in a pressurizing-agent-driven manner.

In order to be able to meet the highest requirements for cleanability, which consist for example in the cleanability of two pairs of seal and valve seat in the product path with simultaneous retention of a sterile barrier, the valve assembly can have at least one second chamber, which has in turn secondary openings to which a steam valve and a switching valve are connected.

The system for conducting a product has a product valve for switching a product flow between a first product line and a second product line, wherein a chamber is provided in the product valve, through which the product can flow and in which a sterile barrier can be designed. The chamber is connected with a switching valve, by means of which an outlet can be connected optionally with the chamber or with an inlet provided on the switching valve. The inlet is connected with a steam line, wherein the chamber is separated from the outlet in the switching process during the establishment of the connection between the outlet and inlet. This system structure omits the sequence valve and leak valve according to the state of the art and allows in this manner steam pressurization with simple means. The component number is reduced; the technical control effort is lowered.

A steam valve arranged between the chamber and a steam line enables advantageously the setup of a steam barrier in the chamber.

The outlet of the switching valve is advantageously connected with a disposal line connected to a branch valve. The branch valve makes it possible to switch over the fluid flow from the outlet to a condensate drain so that, with a simple structure, condensate can be drained from the system.

An advantageous method serves for operating a system which has a first and a second product line, wherein the two product lines can be interconnected by means of a product valve. The product valve comprises a chamber, in which a sterile barrier can be designed in the case of the separation of the first and second product line from each other. Before the opening of the product valve for connecting the first and second product lines, a switching valve is switched over such that a fluid connection between the chamber and a disposal line is switched over to a fluid connection between the steam line and the disposal line. The fluid connections are coupled together through the use of a switching valve. Since either one or the other fluid connection exists and a wrong fluid connection is thus prevented, the method is very secure. Moreover, the switching and control effort is less than in the state of the art, whereby additional security and cost savings are achieved.

Security and simple operation are additionally improved when the method is further developed such that the disposal line is connected with a disposal device via a condensate drain.

The invention shall be explained in greater detail and the representation of the effects and advantages shall be covered in greater detail based on an exemplary embodiment and its further developments.

DETAILED DESCRIPTION

Figure 1:
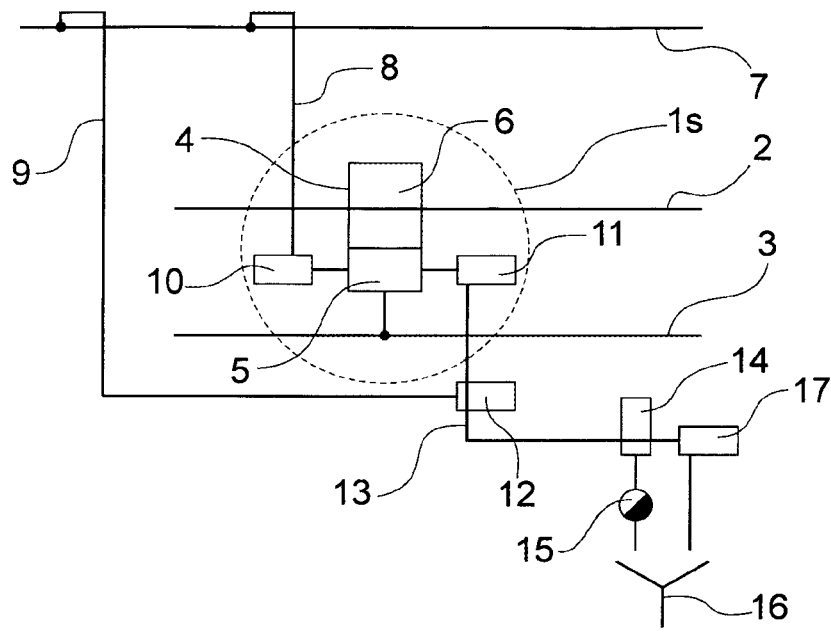
FIG. 1 is a schematic representation of a system with a valve assembly according to the state of the art.
Figure 2:
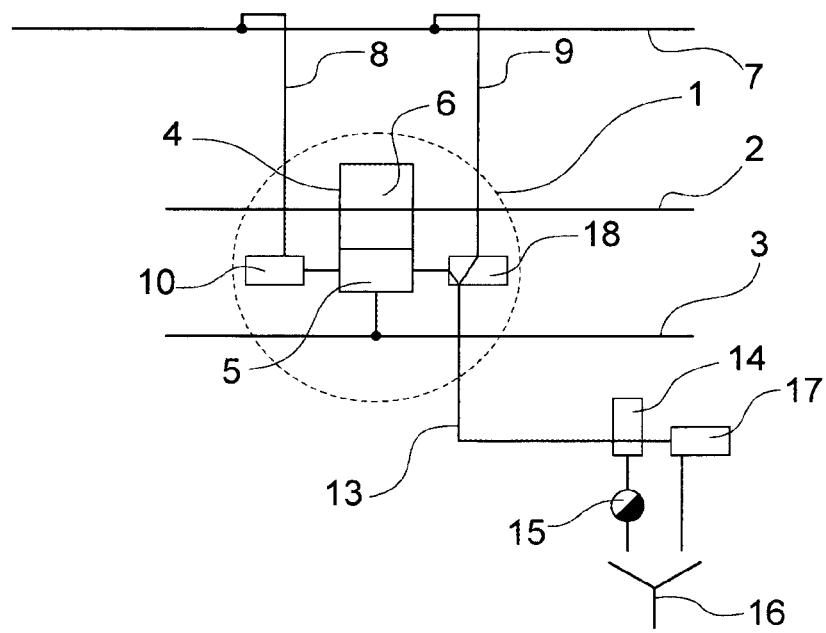
FIG. 2 is a schematic representation of a system with a valve assembly according to an exemplary embodiment of the invention.
Figure 3:
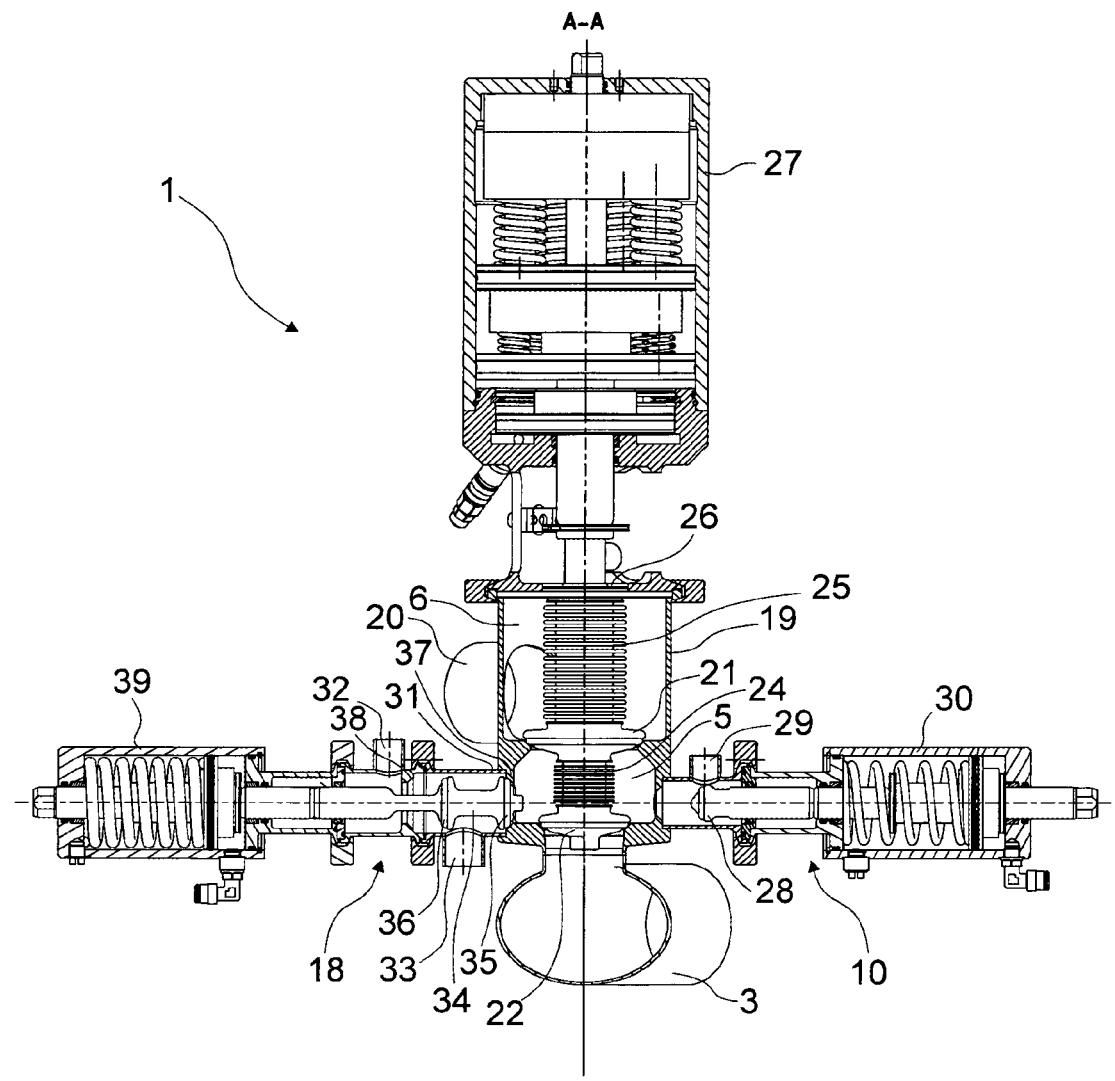
FIG. 3 is a longitudinal section along the intersecting line A-A through the valve assembly of FIG. 2.

A system with a valve assembly 1 for switching a product flow between a first product line 2 and a second product line 3 is shown schematically in FIG. 2. A product valve 4 for blocking or opening a fluid connection between the product lines 2 and 3 is provided in the fluid flow between the product lines 2 and 3. The product valve 4 comprises a chamber 5 and an inlet chamber 6. The chamber 5 is fluid-connected with the second product line 3; the inlet chamber 6 is fluid-connected with the first product line 2. A fluid flow through the chambers 5 and 6 and thus between first and second product lines 2 and 3 is switchable with means that will be explained further below. The system comprises a steam line 7, in which steam with a high water content is conveyed as the sterilization medium. Instead of water vapor, another sterile fluid is conceivable, for example containing peracetic acid or hydrogen peroxide, wherein water vapor is associated with advantages, for example simple availability, cost-effective supply and simple disposal. The steam line 7 is connected with the chamber 5 by means of a first and a second branch line 8 and 9. A steam valve 10 is provided for blocking the steam flow from the steam line 7 into chamber 5.

The system comprises a disposal line 13, which is connected on one side with the valve assembly 1 and on the other side with a branch valve 14. The branch valve 14 makes it possible to connect the disposal line 13 optionally with a condensate drain 15 or a disposal valve 17. The condensate drain 15 opens when condensed steam is present so that the condensed steam is diverted into a disposal device 16. The branch valve 14 can be switched such that the fluid flow to the condensate drain 15 is blocked and is instead directed to the disposal valve 17. If the disposal valve 17 is open, fluid gets into the disposal device 16.

The valve assembly 1 has a switching valve 18, which is connected with the chamber 5, the steam line 7 and the disposal line 13. The connection to the steam line 7 can be direct or indirect. The switching valve 18 is designed and arranged so that a fluid connection between chamber 5 and disposal line 13 can be switched over by switching the switching valve 18 to a fluid connection of the second branch line 9 connected with the steam line 7 with the disposal line 13. In this switching process, the chamber 5 is simultaneously separated from the disposal line 13. The switching process is reversible so that the second branch line 9 is closed and the fluid connection between chamber 5 and disposal line 13 is established.

According to a first embodiment, an advantageous valve assembly 1 is shown in FIGS. 3 to 6.

The product valve 4 of the valve assembly 1 has a housing 19 as the base body, in which and on which functional elements of the product valve 4 and of the valve assembly 1 are arranged.

Within the housing 19, a chamber 5 and an inlet chamber 6 are located in the fluid flow and arranged in series behind each other. A product connection 20 that can be connected with one of the tubings, for example the first product line 2, makes it possible for the fluid flow from the tubing into the inlet chamber 6 and vice versa. If the inlet chamber 6 is connected with the first product line 2, the second product line 3 is connected to the valve assembly 1 such that a fluid flow from the second product line 3 into the chamber 5 is possible. When the valve assembly 1 is open, the fluid flow from the first product line 2 first takes place through the inlet chamber 6, then through the chamber 5 and from there finally into the second product line 3. Depending on the process, the fluid flow can also take place in the opposite direction.

A first closing element 21 and a second closing element 22 are arranged within the housing. The first closing element 21 is designed such that it switches, that is releases or blocks, the fluid flow between chamber 5 and inlet chamber 6 in cooperation with a housing-side element. The second closing element is designed such that it switches the fluid flow between chamber 5 and the tubing connected to it in cooperation with a housing-side element. The first and second closing element 21 and 22 are actuatable independently of each other in their position so that the switching effect of the one closing element 21 or 22 is achievable regardless of the status of the respective other closing element 22 or 21.

The closing elements 21 and 22 are arranged on a valve rod assembly 23. This can comprise for example two rods arranged coaxially to each other, wherein one rod runs in a hollow rod. The rods are designed independently displaceable from each other, and each rod carries one of the closing elements 21 and 22.

The highest hygienic and sterile requirements are met when the valve rod assembly 23 works together with a first and a second bellows 24 and 25.

The first bellows 24 is fastened with its first end on the closing element 21 and with its opposite-lying end on the closing element 22. In this manner, the first bellows 24 surrounds the valve rod assembly 23 between the first closing element 21 and the second closing element 22 in a sealing manner.

The second bellows 25 is fastened in a sealed manner with its first end on the second closing element 22 on its side facing away from the first closing member 21. The opposite-lying end of the bellows 25 ends at the housing passage 26, by means of which the valve rod assembly 23 is guided out of the housing 19. In this manner, the second bellows 25 surrounds in a sealing manner the valve rod assembly 23 between the second closing element 22 and the housing passage 26.

The connection between bellows 24 and 25 and closing elements 21 and 22 can be designed through welding in the case of metallic materials.

The valve rod assembly is operatively connected with a main drive 27. This has means with which the adjustment of the closing elements 21 and 22 is effectuated. Advantageously cost-effective and simple, the main drive 27 is designed pneumatically. In this case, the means for adjusting the closing elements 21 and 22 comprise at least one piston and at least one return spring.

The steam valve 10 is connected to the housing 19. An inner space of the steam valve 10 is connected with the chamber 5 in an open position of a closing member 28 arranged in the inner space. The steam valve 10 has a steam inlet 29, which permits the connecting of the inner space of the steam valve 10 with the steam line 7 of the system. Steam from steam line 7 thereby enters the chamber 5 through the steam valve 10 when the closing member 28 is open. The closing member 28 is adjustable by means of a linearly operating drive 30.

A switching valve 18 is connected to the housing 19. The switching valve 18 has a main inlet 31, which is connected with the housing 19 of the valve assembly 1. The main inlet 31 is arranged such that an inner space of the switching valve 18 can be connected with the chamber 5. In addition to the main inlet 31, the switching valve 18 has as inlet 32 and an outlet 33. The inlet 32 is connected with the steam line 7 in the system, in order to be able to let water vapor into the switching valve 18. The outlet 33 is connected with the disposal line 13 when the switching valve 18 is installed in the system.

A closer 34 with a first sealing assembly 35 and a second sealing assembly 36 is provided in the switching valve 18. The closer 34 can assume different positions, in particular the following two.

In the first of the positions, the first sealing assembly 35 is brought in sealing contact with a first valve seat 37. The main inlet 31 of the switching valve 18 is closed—the inlet is in turn released. In this switch position of the closer 34, there is a fluid connection between inlet 32 and outlet 34.

A switch-over to the second switch position takes place by shifting the closer 34. In it, the second sealing assembly 36 is brought into sealing contact with a second valve seat 38 and the contact between the first sealing assembly 35 and the first valve seat 38 is removed. In this switch position, the fluid connection between inlet 32 and outlet 34 is separated and opened between main inlet 31 and outlet 34. This position of the closer 34 and the switch position of the switching valve 18 associated with it is suitable for forming a sterile barrier, also see FIG. 7. In this switch position, the switching valve 18 also assumes the function of a leak valve for detecting leaks on one of closing elements 21 and 22. The closer 34 is adjustable by means of a linearly operating drive 39. The outlet 34 is arranged between the first and second valve seat 37 and 38 so that, when switching between the first and second switch position, the closer 34 is switched opposite the direction of flow of the fluid, for example opposite the direction of flow of the steam flowing through the inlet 32 into the switching valve 18. This effectuates low-vibration operation of the switching valve 18.

Figure 4:
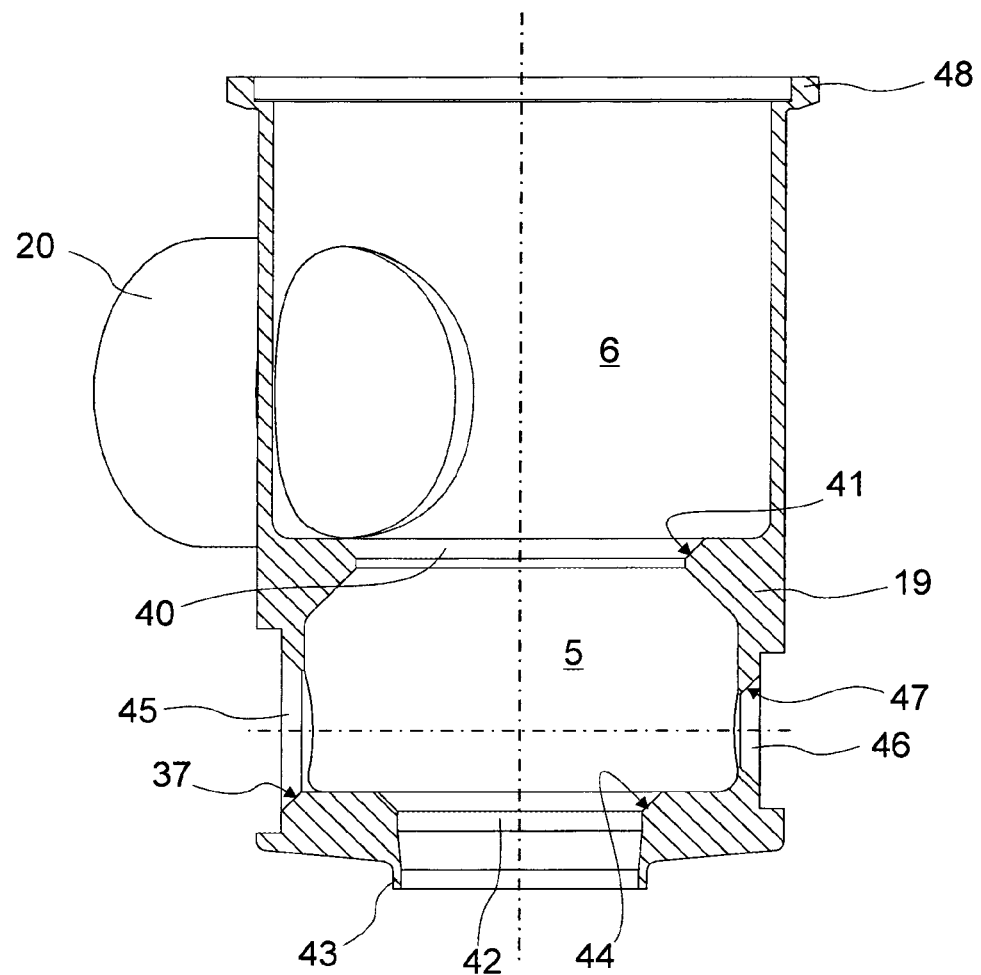
FIG. 4 is a longitudinal section along the intersecting line A-A through a valve housing of FIG. 3.

Further details of the housing 19 are shown in FIG. 4. The base body of the housing 19 is designed mainly cylindrically and cup-shaped. The inlet chamber 6 and the chamber 5 are formed on its inside. A first product opening 40 creates a fluid connection between the inlet chamber 6 and the chamber 5. A valve seat 41, which works together with the first closing element 21, is provided around the product opening 40. A second product opening 42 is designed on the front side of the cup and creates a fluid outlet, which is surrounded by a fitting 43. This fitting 43 makes it possible to connect the housing 19 with a tubing, in particular the second product line 3. A valve seat 44, which works together with the second closing element 22, is designed on the second product opening, surrounding it.

The first and second product opening 41 and 42 and the valve seats connected with them are advantageously arranged coaxially and flush with respect to each other. This makes it possible to design the valve rod assembly 23 with valve rods arranged in each other coaxially so that only the main drive 27 is necessary. The main drive 27 can be connected with the housing 19 by means of a flange 48 attached or formed on the housing 19.

In housing 19, a first and a second secondary opening 45 and 46, which establish access to chamber 5, are provided on the mainly cylindrical wall surface at the height of the chamber 5. The switching valve 18 is connected to the first secondary opening 45. The steam valve 10 is connected to the second secondary opening 46.

The first valve seat 37 of the switching valve 18, which works together with the closer 34, is shaped advantageously in the wall of the housing 19 and around the first secondary opening 45 in order to create a compact valve assembly. The second valve opening 46 is advantageously surrounded by a valve seat 47, which works together with the closing member 28 of the steam valve 10.

Figure 5:
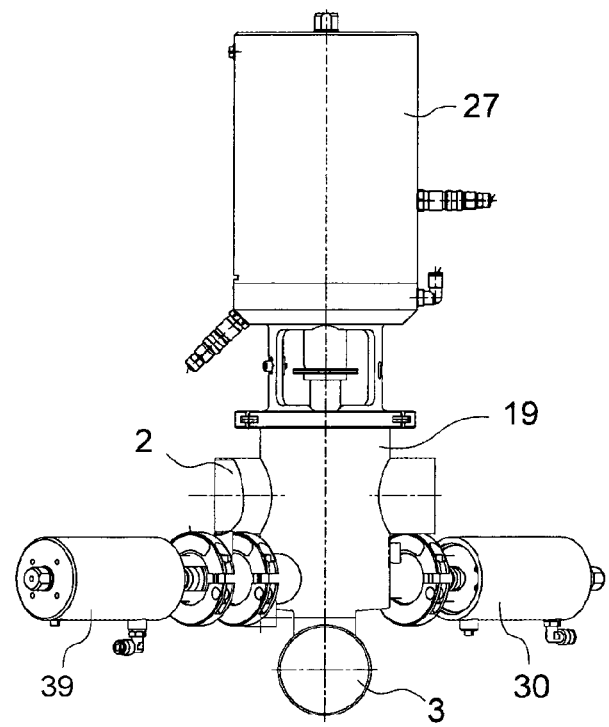
FIG. 5 is a lateral view of the valve assembly of FIG. 2.
Figure 6:
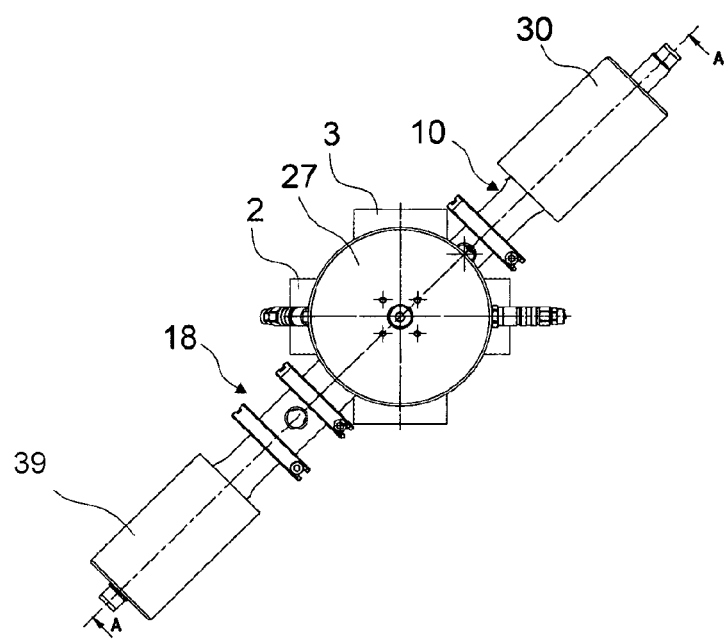
FIG. 6 is a top view of the valve assembly of FIG. 2 along the longitudinal axis.

FIGS. 5 and 6 show the advantageously compact orientation of the individual components of the valve assembly with respect to each other. The alignment of the product connection 20 and fitting 43 makes it possible to align the first and second product lines 2 and 3 at an angle of 90 degrees with respect to each other. The drives 30 and 37 lie in one plane and are arranged on opposite-lying sides of the housing 19 and are twisted with respect to the product lines 2 and 3, for example by 45 degrees, such that the drives 30 and 37 lie between the product lines 2 and 3 in the top view according to FIG. 6. The plane of drives 30 and 37 lies between the planes formed by the product lines 2 and 3. Due to the described angular offset, there is space for the drives 30 and 37 as well as steam valve 10 and switching valve 18 so that the valve assembly is beneficial in terms of installation height. The space-saving effect is increased when the above-mentioned planes are aligned parallel to each other or only form an angle of a few degrees, for example 10 degrees. Clarity and ease of maintenance of comprehensive systems with many tubings and valves are achieved through an alignment of the main drive 27 and housing 19 one below the other in the gravitational direction.

Figure 7:
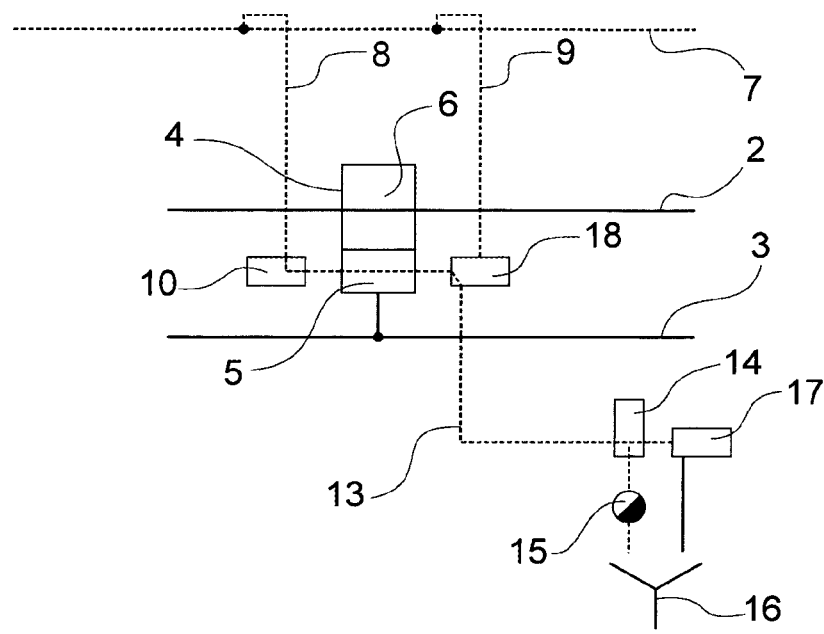
FIG. 7 is a representation of the system in the process step of the sterile separation of the product branches.
Figure 9:
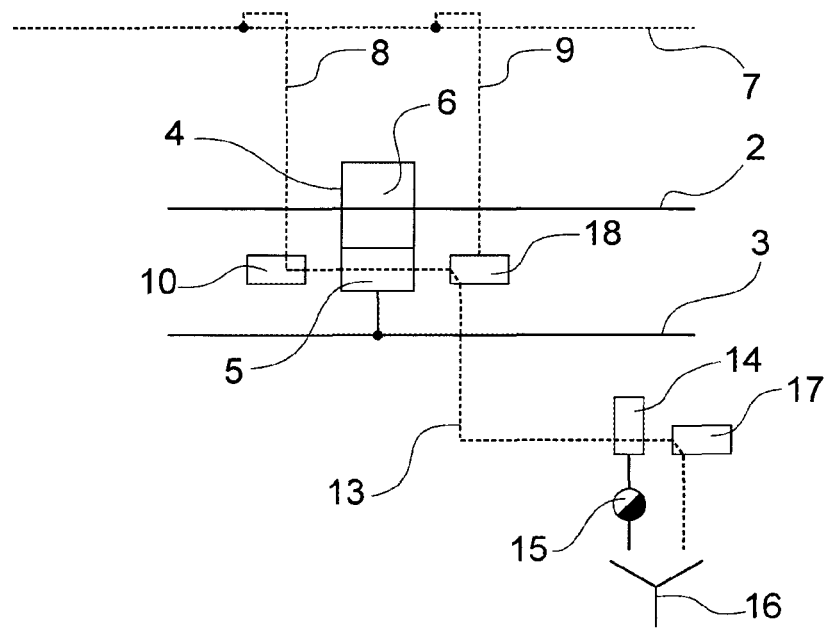
FIG. 9 is a representation of the system in the process step of rinsing.

The functionality of the valve assembly 1 is explained based on FIGS. 7 and 9. All tubing sections and parts of the valve assembly 1, in which a sterile medium, for example steam, is conveyed, are shown dashed in order clarify the functionality. Product flow within the valve assembly 1 is shown with a solid line.

The valve assembly 1 in FIG. 7 is in a switch state in which the inner spaces of the product lines 2 and 3 and the mediums conveyed in them are separated from each other in a sterile manner. In this operating state of the valve assembly 1, chamber 5 and inlet chamber 6 are separated from each other in that the first product opening 41 is closed by the first closing element 21. The second product opening 42 is simultaneously closed by the second closing element 22.

The steam valve 10 is opened. This is achieved in the example shown in that the closing element 28 is separated from the valve seat 47 and the second secondary opening 46 is thus opened.

The switching valve 10 is located in a switch state in which it creates a fluid connection between chamber 5 and disposal line 13 and is separated from the steam line 7. The closer 34 is set such that the first sealing assembly 35 and the first valve seat 37 are separated from each other, while second sealing assembly 36 and second valve seat 38 are in sealing contact. The first secondary opening 45 is opened so that fluid can flow between chamber 5 and outlet 33, while the inlet 32 is closed.

A sterile barrier, which effectuates a secure separation of the contents in the product lines 2 and 3, is created in the chamber 5 through these switch states of the first and second closing element 21 and 22 as well as of the steam valve 10 and switching valve 18. Leaks from the first or second closing element 21 or 22 are detectable in this switch state. The branch valve 14 is advantageously switched such that fluid is directed to the condensate drain 15. Steam is held in the system, while condensate is removed, whereby the sterile properties of the barrier are improved.

Figure 8:
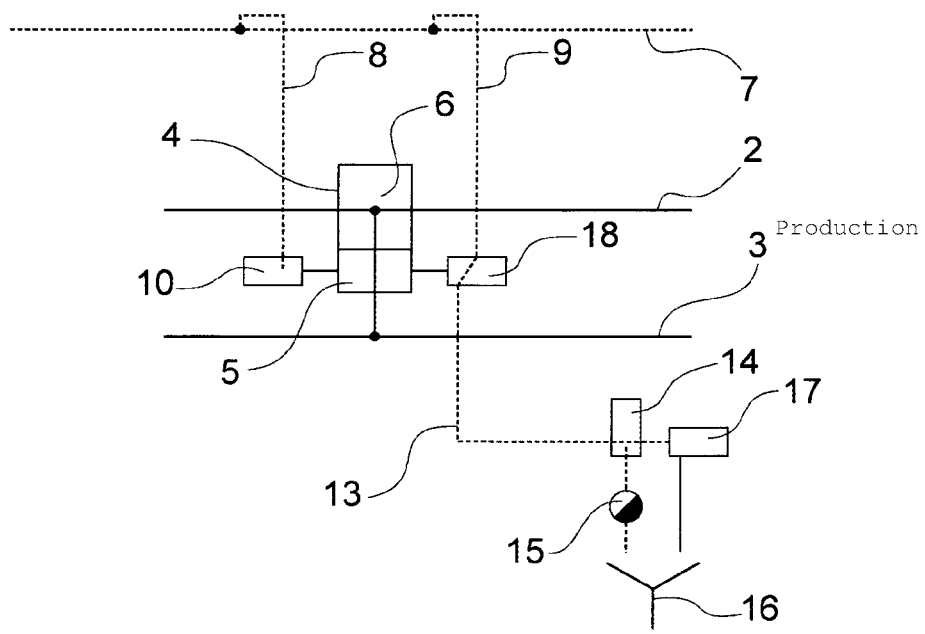
FIG. 8 is a representation of the system in the process step of production.

FIG. 8 shows a switch state of the valve assembly 1, which is suitable for a production process.

The steam valve 10 is closed. In the example, closing member 28 and valve seat 47 of the second secondary opening 46 are in sealing contact for this state of the steam valve 10.

The closer 34 of the switching valve 18 is located in a position in which the fluid connection between inlet 32 and outlet 33 is enabled, while the first secondary opening 45 is closed. The first sealing assembly 35 and the first valve seat 37 are in sealing contact.

Steam in the steam line 7 is thus only directed up to into the steam valve 10 and through the switching valve 18 to the disposal line 13.

First and second secondary openings 45 and 46 of chamber 5 are closed. First and second closing elements 21 and 22 release first and second product openings 40 and 42. A fluid flow, in particular of the product, between the first and second product lines 2 and 3 through chamber 5 and inlet chamber 6 is enabled in this switch state of the valve assembly 1.

It is also advantageous in this switch state to switch the branch valve 14 such that steam flowing through the disposal line 13 is directed to the condensate drain 15.

FIG. 9 shows a switch state in which the valve assembly 1 is cleaned.

The first and second closing elements 21 and 22 are in the closed state and separate, though sealing contact with the respective valve seats 41 and 44, the chamber 5 from the inlet chamber 6, and the chamber 5 from the second product line 3.

The steam valve 10 is opened so the closing member 28 releases the second secondary opening 46. The switching valve 18 is switched such that the first secondary opening 45 is released and a fluid connection is established between chamber 5 and outlet 33. The inlet 32 is closed by the closer 34.

The branch valve 14 is switched such that the fluid flow to the condensate drain 15 is prevented. The disposal valve 17 is opened so that gaseous and liquid fluid flows into the disposal device 16.

This switch state makes it possible to clean particularly thoroughly in particular the chamber 5 with a high throughput of flushing medium. This is advantageous in particular with respect to the cleaning of the folds of the first bellows 24.

Figure 10:
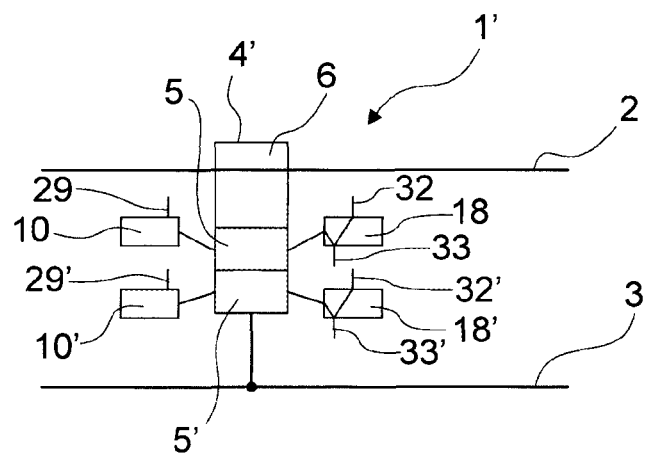
FIG. 10 is schematic representation of a further development of the valve assembly of an exemplary embodiment of the invention.

A further development of the valve assembly 1' is shown in FIG. 10. This valve assembly 1' has a second chamber 5' in addition to the inlet chamber 6 and the chamber 5. The three chambers are arranged behind each other in series in the fluid flow direction. Fluid enters the inlet chamber 6 from the first product line 2, flows through chamber 5, from there enters chamber 5', exits chamber 5' and enters the second product line 3. The chambers 5, 5' and 6 are separable from each other in a fluid-sealed manner by means of individually adjustable closing elements. A steam valve 10 and a switching valve 18 are connected respectively to the chamber 5. Similarly, a steam valve 10' and a switching valve 18' are connected respectively to the second chamber 5'. Each of the steam valves 10 and 10' has a steam inlet 29 and 29'. Both can be connected to a common steam line 7. Both switching valves 18 and 18' have an inlet 32 and 32', through which steam or another sterile fluid can flow into the respective switching valve 18 and 18'. Each switching valve 18 and 18' has an outlet 33 and 33' through which fluid can flow out of the valve assembly 1', and can be supplied in particular to a disposal. This further development of the valve assembly 1' has the advantage of improved cleanability. A sterile barrier can be designed in chamber 5 while the second chamber 5' is cleaned. Depending on the need for cleanability and depending on the process flows, further chambers can be present in addition to chamber 5 and second chamber 5'.

A reference list for the abbreviations and drawing labels is as follows:
1s Valve assembly according to the state of the art
1 Valve assembly
1' Valve assembly according to a further development
2 First product line
3 Second product line
4 Product valve
4' Product valve according to a further development
5 Chamber
5' Second chamber
6 Inlet chamber
7 Steam line
8 First branch line
9 Second branch line
10 Steam valve
10' Second steam valve
11 Leak valve
12 Sequence valve
13 Disposal line
14 Branch valve
15 Condensate drain
16 Disposal device
17 Disposal valve
18 Switching valve
18' Second switching valve
19 Housing
20 Product connection
21 First closing element
22 Second closing element
23 Valve rod assembly
24 First bellows
25 Second bellows
26 Housing passage
27 Main drive
28 Closing member
29 Steam inlet
29' Second steam inlet
30 Drive of the stream valve
31 Main inlet
32 Inlet
32' Second inlet
33 Outlet
33' Second outlet
34 Closer
35 First sealing assembly
36 Second sealing assembly
37 First valve seat
38 Second valve seat
39 Drive of the switching valve
40 First product opening
41 Valve seat
42 Second product opening
43 Fitting
44 Valve seat
45 First secondary opening
46 Second secondary opening
47 Valve seat of the steam valve
48 Flange

The invention claimed is:

1. A valve assembly, comprising:
   a housing with a chamber that has a first product opening, a second product opening, a first closable secondary opening connectable to a steam line, and a second closable secondary opening;
   a first closing element, by which the first product opening is closable;
   a second closing element, by which the second product opening is closable;
   an outlet associated with the second secondary opening; and
   a switching valve arranged between the second secondary opening and the outlet such that a fluid connection of the outlet with the second secondary opening is switched over by switching the switching valve to a fluid connection of the outlet with an inlet of the switching valve connectable to the steam line, while simultaneously closing the second secondary opening.

2. The valve assembly according to claim 1, wherein the first closing element and the second closing element are actuatable independently of each other.

3. The valve assembly according to claim 1, wherein a first bellows is located between the first closing element and the second closing element.

4. The valve assembly according to claim 3, wherein a second bellows is located between the second closing element and a housing passage.

5. The valve assembly according to claim 1, wherein the switching valve comprises a closer that has a first sealing assembly and a second sealing assembly.

6. The valve assembly according to claim 5, wherein one of the first sealing assembly or the second sealing assembly of the closer works together with a valve seat located in the housing.

7. The valve assembly according to claim 5, wherein the first sealing assembly, the second sealing assembly, and valve seats of the switching valve are switched such that a respective closed position is effectuated through a force directed respectively opposite a flow directed at the outlet.

8. The valve assembly according to claim 1, wherein the first closing element, the second closing element, and the switching valve are adjustable using pressurizing-agent-operated drives.

9. The valve assembly according to claim 1, wherein the chamber is a first chamber, a second outlet and a second chamber have third and fourth secondary openings, the first chamber and the second chamber are arranged so as to be flowed through by product in succession, and a second switching valve is arranged between the fourth secondary opening and the second outlet such that a fluid connection of the second outlet with the fourth secondary opening is switched over by switching the second switching valve to a fluid connection of the outlet with a second inlet that can be connected to the steam line, while simultaneously closing the fourth secondary opening.

10. The valve assembly according to claim 1, wherein a bellows is located between the second closing element and a housing passage.

11. A system for conducting a product, comprising:
    a product valve for switching a product flow between a first product line and a second product line;
    a switching valve having an inlet connectable to a steam line; and
    a chamber in the product valve, which can be flowed through by the product and in which a barrier can be formed, the chamber associated with an outlet, wherein the switching valve has a first switch position that has a fluid connection of the outlet with the chamber enabled and the outlet separated from the inlet, and has a second switch position that has a fluid connection of the outlet with the inlet enabled and the chamber separated from the outlet, and wherein the switching valve is switched over from the first switch position to the second position by switching the switching valve to the fluid connection of the outlet with the inlet of the switching valve, while simultaneously separating the chamber from the outlet.

12. The system according to claim 11, wherein a steam valve is connected with the chamber and the steam line.

13. The system according to claim 11, wherein the outlet is connected with a disposal line, the system further comprising:

a branch valve for forming a fluid connection of the disposal line with a condensate drain.

14. A method for operating a system with a first product line and a second product line, wherein the first product line and the second product line are interconnected by a product valve and wherein a sterile barrier is formed in a chamber of the product valve, the method comprising:

before opening the product valve for connecting the first product line and the second product line, switching a switching valve from a first switch position forming a fluid connection between the chamber and a disposal line to a second switch position forming a fluid connection between a steam line and the disposal line and separating the chamber from the disposal line.

15. The method according to claim 14, wherein the disposal line is connected with a disposal device via a condensate drain.

16. The method according to claim 14, wherein the steam line is separated from the disposal line in the first switch position.

* * * * *